United States Patent
Pacella et al.

(10) Patent No.: US 9,525,634 B2
(45) Date of Patent: Dec. 20, 2016

(54) DYNAMIC FILTERING AND LOAD OPTIMIZATION INSTRUCTIONS BASED ON SUBSCRIBTION AND REAL-TIME NETWORK AND SERVICE LOAD DATA

(71) Applicant: Verizon Patent and Licensing Inc., Arlington, VA (US)

(72) Inventors: Dante J. Pacella, Charles Town, WV (US); Mark D. Carney, Sterling, VA (US); Syed Ammar Ahmad, Ashburn, VA (US); Josyula Venkata, Ashburn, VA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 14/140,406

(22) Filed: Dec. 24, 2013

(65) Prior Publication Data

US 2015/0180764 A1   Jun. 25, 2015

(51) Int. Cl.
  *H04L 12/725*  (2013.01)
  *H04L 12/803*  (2013.01)

(52) U.S. Cl.
  CPC .......... *H04L 47/125* (2013.01); *H04L 45/306* (2013.01)

(58) Field of Classification Search
  CPC .. G06Q 30/0267; G06Q 30/0246; H04M 3/42; H04M 15/66; H04L 65/80; H04L 12/5692; H04L 12/1489; H04L 45/308; H04L 41/0803; H04L 41/147; H04L 41/50; H04L 47/125; H04L 47/20
  See application file for complete search history.

(56) References Cited

U.S. PATENT DOCUMENTS

| | | | | |
|---|---|---|---|---|
| 8,248,932 B2* | 8/2012 | Wang | ...................... | H04L 12/14 370/231 |
| 2009/0003206 A1* | 1/2009 | Bitar | .......................... | 370/230.1 |
| 2010/0254409 A1* | 10/2010 | Lu et al. | ....................... | 370/477 |
| 2010/0322074 A1* | 12/2010 | Nakahira | ....................... | 370/235 |
| 2011/0110232 A1* | 5/2011 | Abraham et al. | ............. | 370/235 |
| 2012/0127881 A1* | 5/2012 | Wiley et al. | ............... | 370/252 |
| 2012/0230328 A1* | 9/2012 | Morrill et al. | ............... | 370/389 |
| 2014/0031006 A1* | 1/2014 | Moore et al. | ................ | 455/405 |
| 2014/0169788 A1* | 6/2014 | Hussain et al. | ................ | 398/43 |
| 2014/0355427 A1* | 12/2014 | Cheng | .......................... | 370/230 |
| 2015/0009826 A1* | 1/2015 | Ma et al. | ...................... | 370/235 |

* cited by examiner

*Primary Examiner* — Brian J Gillis
*Assistant Examiner* — Matthew Ballard

(57) ABSTRACT

A server may receive flow information from multiple network devices. The flow information may include information regarding multiple data flows received by the multiple network devices and destined for a client device. The server may determine generate an optimization instruction, based on flow information, to re-route one or more of the plurality of data flows or to apply filters to the one or more of the plurality of data flows; provide the optimization instruction to cause one or more of the multiple network devices to re-route one or more of the multiple data flows or to apply filters to the one or more data flows to alleviate overloaded network components or to re-route network resources to or from the client device; receive updated flow information after receiving the flow information; generate an updated optimization instruction based on the updated flow information; and provide the updated optimization instruction.

20 Claims, 9 Drawing Sheets

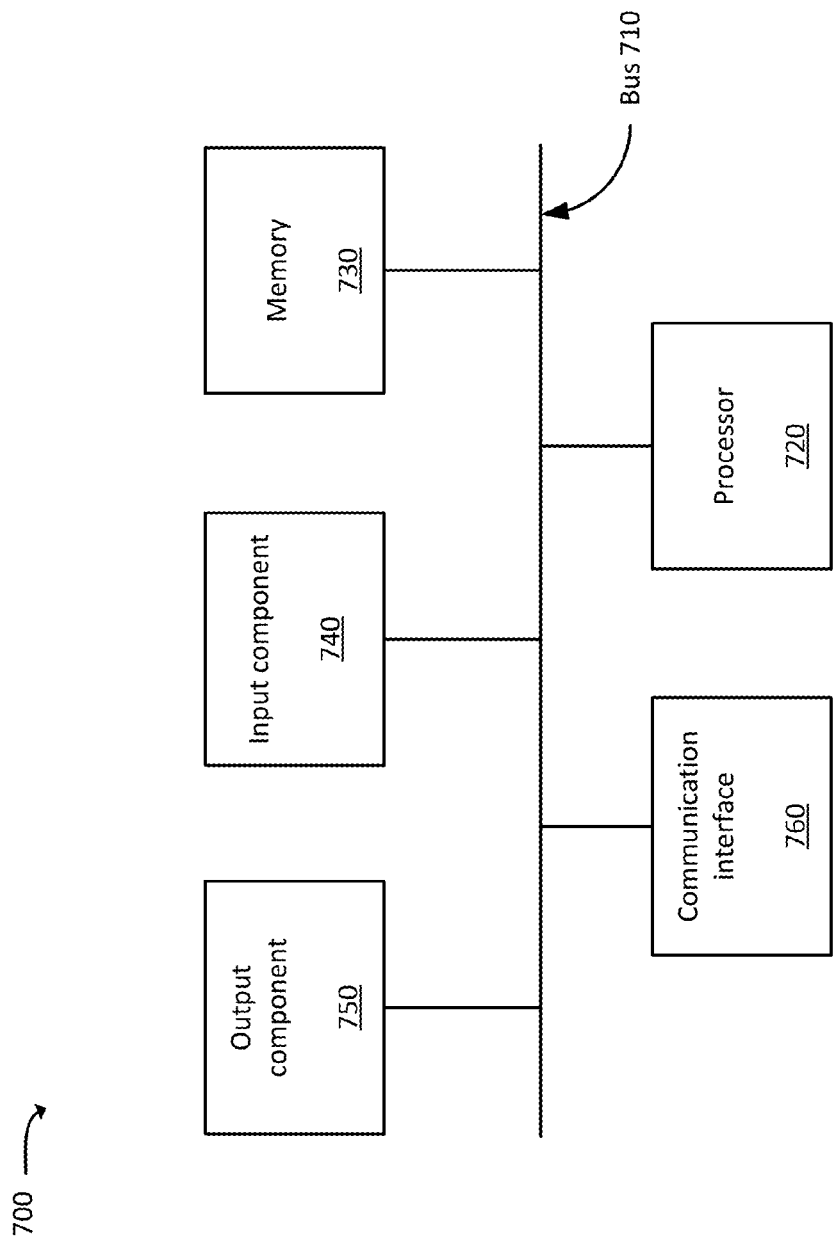

DYNAMIC FILTERING AND LOAD OPTIMIZATION INSTRUCTIONS BASED ON SUBSCRIBTION AND REAL-TIME NETWORK AND SERVICE LOAD DATA

BACKGROUND

Network components within a network may provide data transmission services (e.g., bandwidth, data mitigation services and/or other network services, etc.) to a client device in accordance with subscription information. For example, the subscription information may identify that the client device may receive a particular amount of network bandwidth and/or a particular amount of network service.

To prevent a client device from receiving greater data transmission services than subscribed to by the client device, filters may be implemented. For example, assume that a client device is subscribed to receive a bandwidth of 100 gigabits per second (100 Gbps) via 10 backend network devices. Further, assume that 10 Gbps filters are applied to each backend network device to prevent the client device from receiving greater than the 100 Gbps of subscribed bandwidth. Further, assume that at one of the backend network devices, a burst of 40 Gbps of data is received and destined for the client device, and that at the other nine backened devices, an aggregate of 60 Gbps of data is received and destined for the client device. Given these assumptions, the filter at the backend network device receiving 40 Gbps of data would cause the backend network device to drop 30 Gbps worth of bandwidth and provide 10 Gbps of data. Since the other nine network devices provide 60 Gbps of data, the client device would receive 70 Gbps of data in relation to the 100 Gbps with which the client device is subscribed.

Continuing with the above example, the filters at each backend network device may be provisioned to permit 100 Gbps of bandwidth at each of the ten backend network devices to prevent the client device from receiving fewer data transmission services than the client device is subscribed. However, these filters may permit the client device to receive greater bandwidth than the client device is subscribed (e.g., up to 1000 Gbps of bandwidth) which may prevent other client devices from receiving the subscribed bandwidth. Also, filters may prevent the client device from receiving greater data transmission services even when network devices have capacity to provide the greater data transmission services.

In addition to being subscribed to receive a particular bandwidth, the client device may be subscribed to receive network services that operate on the bandwidth. For example, filters may cause the client to receive a fewer amount or a greater amount of serviced data than the client device is subscribed. Also, network components (e.g., network devices and processing servers) may be overloaded (e.g., from a hardware standpoint) even when a client device receives a subscribed level of data transmission services.

BRIEF DESCRIPTION OF THE DRAWINGS

FIG. 7 illustrates example components of one or more devices, according to one or more implementations described herein

DETAILED DESCRIPTION OF THE PREFERRED EMBODIMENTS

The following detailed description refers to the accompanying drawings. The same reference numbers in different drawings may identify the same or similar elements.

Systems and/or methods, as described herein, may provide optimization instructions to network devices in a network to alleviate overloaded network components (e.g., network devices and/or processing servers). Additionally, the systems and/or methods may provide optimization instructions to deliver a level of data transmission services in accordance with client subscriptions. For example, to identify overloaded network components, the systems and/or methods may measure network load at different points within a network (e.g., at ingress points of network components, and/or at paths connecting the network components).

In some implementations, systems and/or methods may measure client device network utilization (e.g., an amount of data transmission services received by a client device). For example, the systems and/or methods may measure an amount of bandwidth consumed by a client device and/or an amount of data flow services received by the client device. Based on the measure of client device network utilization, the systems and/or methods provide optimization instructions to redirect network resources from oversubscribed client devices (e.g., client devices receiving greater than a subscribed level of network resources), to undersubscribed client devices. Also, the systems and/or methods may measure network load and/or client device network utilization in real time, identify trends in the network load and/or client device network utilization measurements, and may adjust the optimization instructions based on real-time network load and/or client device network utilization measurements.

Figure 1:
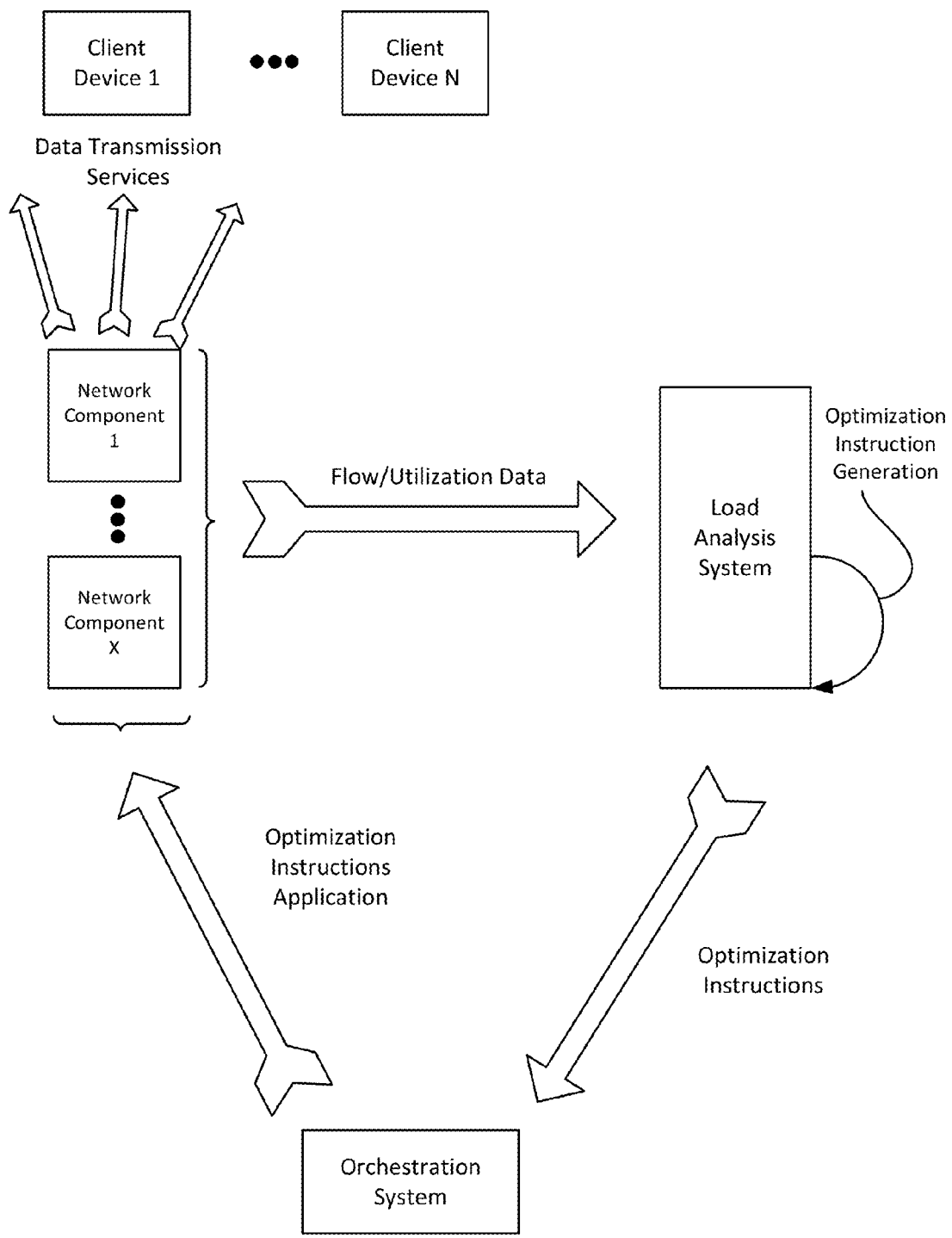
FIG. 1 illustrates an example overview of an implementation described herein.

FIG. 1 illustrates an example overview of an implementation described herein. In FIG. 1, network components 1 through X (where X≥1) may include network devices and/or processing servers that provide data transmission services (e.g., network connectivity, network bandwidth, and/or network services, such as a Distributed Denial of Service (DDOS) attack mitigation services, firewall services, and/or some other type of network service) to one or more client devices (e.g., client device 1 through client device N, where N≥1). As shown in FIG. 1, network components 1 through X may provide flow and/or service utilization data to a load analysis system. The flow data may include information regarding data flows, such as particular client devices associated with the data flows, data rates (e.g., bandwidth) of the data flows, and paths via which the data flows are transmitted. The service utilization data may identify an amount of data that has been serviced by the network components and provided to client devices. The flow information and/or the service utilization information may also include hardware load information.

Based on receiving the flow information and/or the service utilization information, the load analysis system may measure client device network utilization (e.g., an amount of aggregate bandwidth and/or serviced data received by a client device). Further, the load analysis system may measure network load at ingress points of network components 1 through X and paths connecting network components 1 through X. In some implementations, the network load may correspond to client device network utilization. For example, 10 gigabits per second (Gbps) of network load at network component 1 may correspond to 10 Gbps of client device network utilization (e.g., for one or more client devices) at network component 1. The load analysis system may further monitor hardware load of network components 1 through X based on information included in the flow information and/or the service utilization information.

The load analysis system may further identify overloaded network components (e.g., by comparing the measure of network load and/or hardware load with network load capacity and/or hardware load capacity). Further, the load analysis system may compare client device network utilization measurements with client subscription information to identify client devices that receive greater or fewer data transmission services than a subscribed level of data transmission services.

Based on the measurements of load (e.g., network load and/or hardware load) and the measurements of client device network utilization, the load analysis system may generate optimization instructions in order to alleviate overloaded network components and deliver a level of data transmission services in accordance with client subscriptions. For example, the optimization instructions may reallocate network resources from an oversubscribed client device (e.g., a client device that is receiving greater data transmission services that the oversubscribed client device is not subscribed) to an undersubscribed client device (e.g., a client device that is not receiving a level of data transmission services in accordance with a subscription of the undersubscribed client device). As an example of an undersubscribed client device, assume that network devices receive data flows, destined for a client device, at a bit rate of 100 Gbps and that the client device is subscribed to 100 Gbps of bandwidth. Further, assume that client device receives only 50 Gbps of bandwidth. Given this assumption, the client device is considered to be "undersubscribed."

Additionally, or alternatively, the optimization instructions may direct the network components to re-route particular data flows to underloaded network components to alleviate overloaded network components. In some implementations, the load analysis system may receive a continuous stream of flow and/or utilization information in real time, determine a measure of load and client device network utilization in real-time, identify trends in measures of load and client device network utilization, and adjust the optimization instructions based on the real-time load and client device network utilization measurements. As further shown in FIG. 1, the optimization instructions may be provided to an orchestration server and the orchestration server may apply the optimization instructions to the network components.

In some implementations, the optimization instruction may include a filter implemented at one or more network devices to drop data packets. Additionally, or alternatively, the optimization instruction may include an instruction to re-route data flows to underloaded network components. Additionally, or alternatively, the optimization instruction may include some other type of instruction to balance load across a network and to prevent an oversubscribed client device from receiving greater data transmission services than subscribed at the expense of another client device (e.g., an undersubscribed client device). Further, the optimization instruction may permit an oversubscribed client device to receive greater data transmission services than subscribed when the network components have the capacity to provide the data transmissions services.

Figure 2:
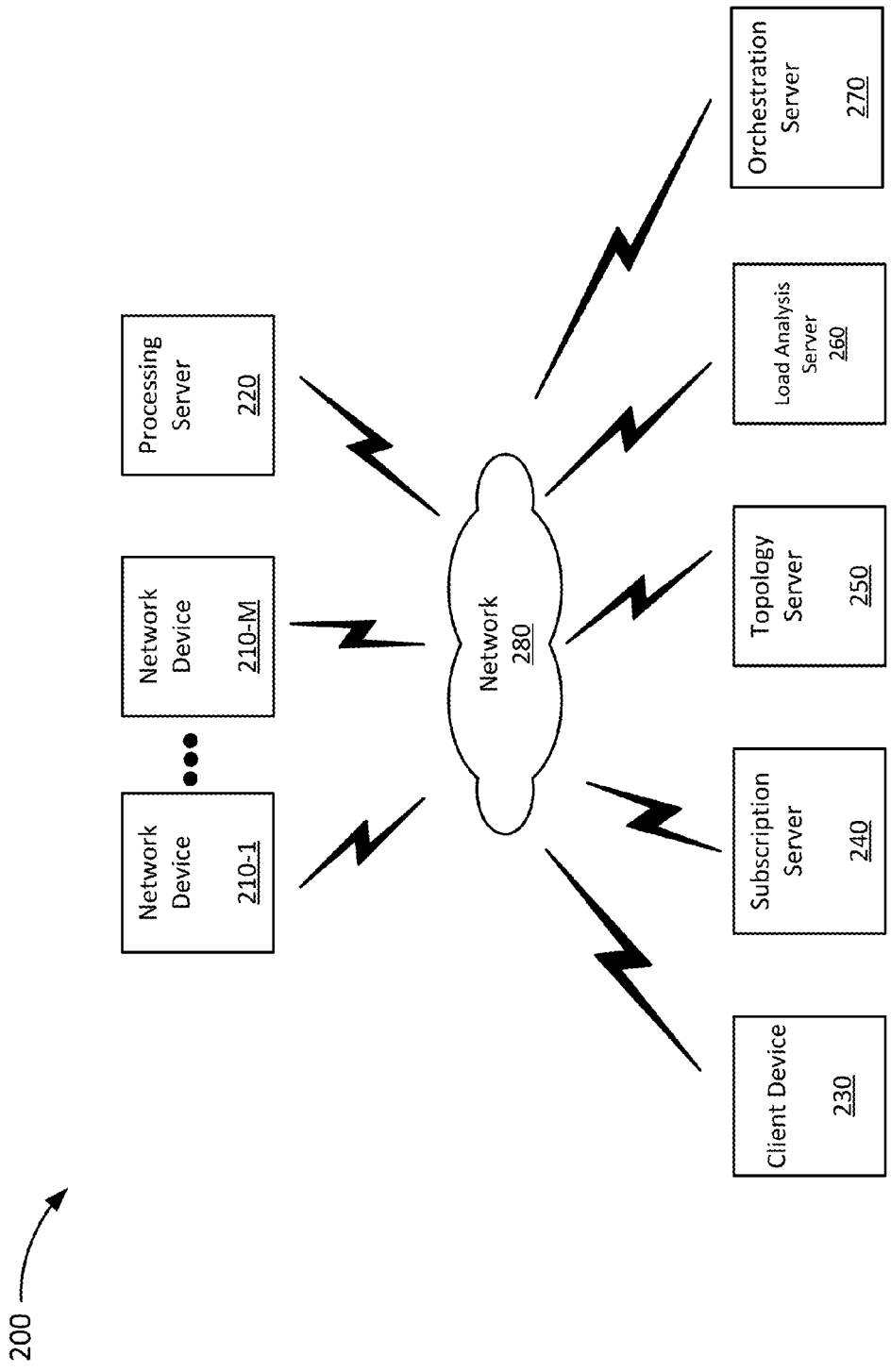
FIG. 2 illustrates an example environment in which systems and/or methods, described herein, may be implemented.

FIG. 2 is a diagram of an example environment 200 in which systems and/or methods described herein may be implemented. As shown in FIG. 2, environment 200 may include network devices 210-1 through 210-M (where M≥1), processing server 220, client device 230, subscription server 240, topology server 250, load analysis server 260, orchestration server 270, and network 280.

Network device 210 may include one or more network devices, such as a gateway, a router, a modem, a switch, a firewall, a network interface card (NIC), a hub, a bridge, a proxy server, an optical add-drop multiplexer (OADM), or some other type of device that processes and/or transfers data. In some implementations, network device 210 may include a backend network device 210, an intermediate network device 210, a client network device 210 (e.g., a client edge gateway or the like), a servicing network device 210, and/or some other type of network device. A backend network device 210 may receive data that is destined for client device 230 and may provide the data towards client device 230 via an intermediate network device 210 and via a client network device 210. An intermediate network device 210 may receive data from multiple backend network devices 210 and may provide the data towards client device 230 via client network device 210 and/or via a servicing network device 210. A servicing network device 210 may receive data, provide the data to processing server 220 for servicing, and provide serviced data, formed by processing server 220, towards client device 230 via client network device 210. Client network device 210 may provide aggregate bandwidth to client device 230. As an example, client network device 210 may provide 100 Gbps of aggregate bandwidth to client device 230 when ten backend network devices 210 each provide data at 10 Gbps.

Each network device 210 may provide flow information to load analysis server 260. In some implementations, the flow information may identify a particular client device 230 associated with the data flow, a quantity of bytes included in a sample of the data flow, a port and/or hardware interface via which the data flow is transmitted, and/or some other information regarding the data flow.

Processing server 220 may include one or more computing devices, such as a server device or a collection of server devices. In some implementations, processing server 220 may receive data from network device 210 (e.g., a servicing network device 210), process the data to form serviced data, and provide the service data towards client device 230 via servicing network device 210 and/or client network device 210. For example, processing server 220 may receive data that is to be serviced, such as a DDOS mitigation service, a firewall service, a virus scan service, and/or some other type of network service. When providing a DDOS mitigation service, for example, processing server 220 may receive data, originated from backend network device 210 and destined for client device 230, identify non-malicious data and malicious data, and provide the non-malicious data towards client device 230 while discarding malicious data. In some implementations, processing server 220 may provide (e.g., to load analysis server 260), service utilization information relating to a measure of network services provided to client device 230 (e.g., a quantity of bytes serviced by processing server 220 and/or a bit rate of a data flow that is being serviced). Additionally, or alternatively, processing server 220 may provide hardware load information associated with processing server 220, such as processor load, memory load, input/output interface load, etc.

Client device 230 may include one or more network devices, such as a gateway, a router, a modem, a switch, a firewall, a NIC, a hub, a bridge, a proxy server, an OADM, or some other type of device that processes and/or transfers data. In some implementations, client device 230 may receive data transmission services (e.g., network connectivity, network services, network bandwidth, etc.) via network devices 210 and/or processing server 220. In some implementations, client device 230 may process and/or transfer data within a network, such as network 280.

Subscription server 240 may include one or more computing devices, such as a server device or a collection of server devices. In some implementations, subscription server 240 may store subscription information that identifies data transmission services to which a client device 230 is subscribed. For example, subscription server 240 may store subscription information that identifies that a particular client device 230 is subscribed to receive a particular amount of bandwidth (e.g., in bits per second (BPS)). Additionally, or alternatively, subscription server 240 may store subscription information that identifies that the particular client device 230 is subscribed to a particular level of network services (e.g., bit rate of a data flow to be serviced by processing server 220).

Topology server 250 may include one or more computing devices, such as a server device or a collection of server devices. In some implementations, topology server 250 may store network topology information regarding a connections and/or paths between network devices 210. For example, topology server 250 may store information that identifies a path between a back-end network device 210 and an intermediate network device 210, an intermediate network device 210, and a client network device 210, etc. In some implementations, topology server 250 may store information identifying network load capacity at each path and at ingress points of each network device 210.

Load analysis server 260 may include one or more computing devices, such as a server device or a collection of server devices. In some implementations, load analysis server 260 may receive flow information from network devices 210 and/or service utilization information from processing server 220. Based on receiving the flow information and/or service utilization information, load analysis server 260 may determine a measure of client device network utilization for client device 230 (e.g., aggregate bandwidth utilization and/or network service utilization), network load, and/or hardware load. Load analysis server 260 may generate optimization instructions based on the measure of client device network utilization, network load, and/or hardware load. As described above, the optimization instructions may redirect network resources from oversubscribed client devices 230 to undersubscribed client devices 230, and/or alleviate overloaded network devices 210 and/or processing servers 220. In some implementations, load analysis server 260 may continuously receive flow information and/or service utilization in real-time, may update client device network utilization and/or load measurements in real-time, and adjust optimization instructions based on real-time updates to the client device network utilization and/or load measurements.

Orchestration server 270 may include one or more computing devices, such as a server device or a collection of server devices. In some implementations, orchestration server 270 may receive optimization instructions from load analysis server 260 and may apply the optimization instructions to network devices 210. For example, orchestration server 270 may apply filters to one or more network devices 210 and/or update routing tables to one or more of network devices 210 to cause network devices 210 to modify a path in which data is transmitted. Additionally, or alternatively, orchestration server 270 may perform some other task in relation to applying optimization instructions.

Network 280 may include one or more wired and/or wireless networks. For example, network 280 may include a cellular network (e.g., a second generation (2G) network, a third generation (3G) network, a fourth generation (4G) network, a fifth generation (5G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, network 280 may include a local area network (LAN), a wide area network (WAN), a metropolitan network (MAN), the Public Switched Telephone Network (PSTN), an ad hoc network, a managed Internet Protocol (IP network, a virtual private network (VPN), an intranet, the Internet, a fiber optic-based network, and/or a combination of these or other types of networks.

The quantity of devices and/or networks in environment is not limited to what is shown in FIG. 2. In practice, environment 200 may include additional devices and/or networks; fewer devices and/or networks; different devices and/or networks; or differently arranged devices and/or networks than illustrated in FIG. 2. Also, in some implementations, one or more of the devices of environment 200 may perform one or more functions described as being performed by another one or more of the devices of environment 200. Devices of environment 200 may interconnect via wired connections, wireless connections, or a combination of wired and wireless connections.

Figure 3:
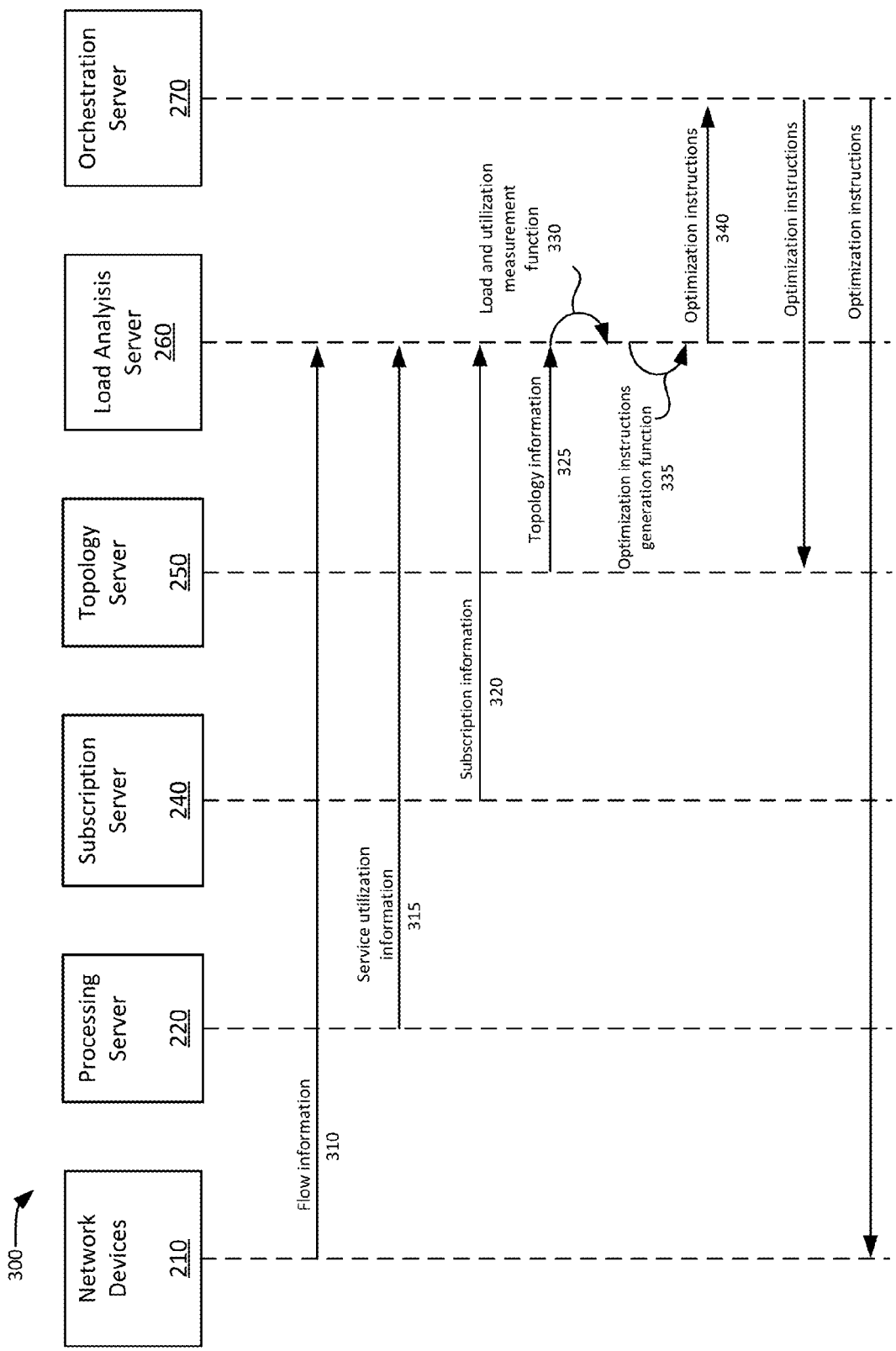
FIG. 3 illustrates a signal flow diagram of example operations for determining load information at different points in a network.

FIG. 3 illustrates a signal flow diagram of example operations for determining load information at different points in a network. As shown in FIG. 3, network devices 210 may each provide flow information 310 to load analysis server 260. In some implementations, network devices 210 may periodically provide flow information 310 (e.g., every five seconds, every ten seconds, every thirty seconds, or at some other interval) such that load analysis server 260 may receive real-time and up-to-date flow information 310. Flow information 310 may include a sample of a data flow destined for a particular client device 230, an identifier (ID) of the particular client device 230 associated with the data flow (e.g., based on a destination IP address of the data flow), an identifier of a particular network device 210 that transmitted the data flow, an interface and/or port ID via which the data flow is transmitted, and/or some other information regarding the data flow. In some implementations, flow information 310 may include hardware load information for network device 210 (e.g., processor load, disk/memory load, input/output interface load, etc.).

As further shown in FIG. 3, processing server 220 may provide service utilization information 315 to load analysis server 260. In some implementations, processing server 220 may periodically provide service utilization information 315 (e.g., at times in accordance with when network devices 210 provide flow information 310 and/or at some other time)

such that such that load analysis server 260 may receive real-time and up-to-date service utilization information 315. Service utilization information 315 may include a sample of a data flow destined for a particular client device 230 and serviced by processing server 220, and may identify a bit rate of the data flow and/or a quantity of bytes serviced. Service utilization information 315 may further include the ID of the particular client device 230 that is to receive the data flow after being serviced by processing server 220. In some implementations, service utilization information 315 may further include hardware load data, such as processor load, memory/disk load, input/output interface load, etc. In some implementations, network devices 210 may provide service utilization information 315. For example, a service network device 210 may provide service utilization information 315. In some implementations, flow information 310 may include service utilization information 315, or vice versa.

As further shown in FIG. 3, subscription server 240 may provide subscription information 320 to load analysis server 260. In some implementations, subscription information 320 may include information identifying a level of data transmission services to which client device 230 is subscribed (e.g., a subscription threshold). For example, subscription information 320 may identify that client device 230 is to receive a particular amount of aggregate bandwidth from client network device 210 and/or a particular level of service from processing server 220. In some implementations, subscription server 240 may provide updates to subscription information 320 when subscription information for client device 230 is updated (e.g., when an administrator of client device 230 selects to modify a subscription for data transmission services provided by network devices 210 and/or processing server 220).

As further shown in FIG. 3, topology server 250 may provide topology information 325 to load analysis server 260. In some implementations, topology information 325 may identify paths between network devices 210 and may identify a network topology of a network including network devices 210 and/or processing server 220. For example, topology information 325 may include a table that identifies physical connections (e.g., ports and/or interfaces) and/or logical connections via which network devices 210 are connected. In some implementations, topology information 325 may identify provisioned load capacity of ingress network load of network devices 210. Additionally, or alternatively, topology information 325 may identify provisioned load capacities of paths between network devices 210. Additionally, or alternatively, topology information 325 may identify provisioned hardware load capacities of network devices 210 and/or processing server 220. In some implementations, topology server 250 may provide updates to topology information 325 when network topology is modified (e.g., when physical and/or logical connections between network devices 210 are modified).

As further shown in FIG. 3, load analysis server 260 may determine (e.g., as part of load and utilization measurement function 330) client device network utilization, such as aggregate bandwidth utilization (e.g. a sum of bandwidth utilization across multiple network devices 210 and output via a client network device 210 to client device 230) and/or service utilization (e.g., a quantity of bytes and/or a bit rate of a data flow serviced by processing server 220 for client device 230). Further, load analysis server 260 may measure network load, and/or hardware load as part of load and utilization measurement function 330.

In some implementations, load analysis server 260 may determine bandwidth utilization for a particular client device 230 at a particular network device 210 based on information included in data flow information 310. For example, based on flow information 310, load analysis server 260 may identify a particular data flow, a particular network device 210 via which the data flow is transmitted, a port via which the data flow is transmitted, a particular client device 230 associated with the data flow, and a bit rate. The bit rate may relate to a measure of bandwidth utilization for the particular client device 230 at the particular network device 210. Based on receiving flow information 310 from each network device 210, load analysis server 260 may determine bandwidth utilization at each network device 210 and aggregate bandwidth utilization at client network device 210 (e.g., aggregate bandwidth provided to the particular client device 230 via client network device 210). Load analysis server 260 may further determine network load at each ingress point of each network device 210 and of each path connecting multiple network devices 210 based on flow information 310 received from each network device 210 and based on network topology information 325.

As an example, assume that load analysis server 260 receives flow information 310 for a data flow provided by a first backend network device 210, (e.g., network device 210-1) destined for client device 230. Further, assume that load analysis server 260 determines a data rate associated with the data flow (e.g., 10 Gbps). Further, assume that flow information 310 indicates that the data flow was provided by network device 210-1 via a port having the port ID 1. Further, assume that topology information 325 indicates that the port of network device 210-1 having port ID 1 connects to a port on an intermediate network device 210 (e.g., network device 210-2) having the port ID 1. Given this assumption, load analysis server 260 may determine a network load of 10 Gbps between the path of network device 210-1 and network device 210-2. Further, load analysis server 260 may determine a network load of 10 Gbps at the ingress of network device 210-1 since network device 210-1 provided the data flow at a rate of 10 Gbps. Further, load analysis server 260 may determine a bandwidth utilization of 10 Gbps for client device 230 at network device 210-1.

Continuing with the above example, assume that load analysis server 260 receives flow information 310 for another data flow, destined for client device 230, and provided by a second backend network device 210 (e.g., network device 210-3). Further, assume that load analysis server 260 determines a data rate of 20 Gbps for the data flow. Further, assume that flow information 310 indicates that the data flow was provided by network device 210-3 via a port having the port ID 1. Further, assume that topology information 325 indicates that the port of network device 210-3 having the port ID 1 connects to a port on network device 210-2 having the port ID 2. Given this assumption, load analysis server 260 may determine a network load of 20 Gbps between the path of network device 210-3 and network device 210-2. Further, load analysis server 260 may determine a load of 20 Gbps at the ingress of network device 210-2 since network device 210-2 provided the data flow at a rate of 20 Gbps. Further, load analysis server 260 may determine a load of 30 Gbps at the ingress of network device 210-2 (e.g., since the sum of the load at port ID 1 and port ID 2 of network device 210-2 is 30 Gbps.)

Continuing with the above example, assume that load analysis server 260 receives flow information 310 for another data flow from network device 210-3 to client network device 210 (e.g., network device 210-4). Further, assume that load analysis server 260 determines a data rate of 30 Gbps for the data flow and that the data flow is destined for client device 230. Further, assume that load analysis server 260 receives load information 310 for another data flow from a second intermediate network device 210 (e.g., network device 210-5) to network device 210-4 and destined for client device 230. Further, assume that load analysis server 260 determines a data rate of 80 Gbps for the data flow. Given this assumption, load analysis server 260 may determine an ingress network load of 110 Gbps for network device 210-4 and that client device 230 receives an aggregate bandwidth of 110 Gbps. That is, the aggregate bandwidth utilization of client device 230 is 110 Gbps.

In some implementations, load analysis server 260 may measure service utilization based on service utilization information 315 to identify a bit rate of a data flow serviced by processing server 220. In some implementations, load analysis server 260 may measure service hardware load based on hardware load data included in service utilization information 315, such as processor load, disk utilization load, input/output interface load, etc. Examples of presentations of load measurements at different points in a network are described below with respect to FIGS. 5A-5C. In some implementations, load analysis server 260 may store the client device network utilization measurements and/or the load measurements and may identify trends associated with the stored measurements as described in greater detail below.

As further shown in FIG. 3, load analysis server 260 may generate optimization instructions, based on determining client device network utilization measurements and load measurements. Further, load analysis server 260 may generate the optimization instructions based on receiving subscription information 320 and topology information 325. For example, load analysis server 260 may compare client device network utilization measurements with subscription information 320 to identify oversubscribed and undersubscribed client devices 230. Additionally, or alternatively, load analysis server 260 may compare network and/or hardware load measurements with topology information 325 to identify overloaded and/or underloaded network devices 210 (e.g., based on information included in topology information 325 that identifies the capacity of ingress points of network devices 210, the capacity of paths connecting network devices 210, and/or hardware load capacity). Load analysis server 260 may thus generate the optimization instructions to alleviate overloaded network devices 210 and/or processing servers 220. Further load analysis server 260 may generate the optimization instructions to redirect network resources from oversubscribed client devices 230 to undersubscribed client devices 230.

Optimization instructions 340 may include filters to cause one or more network devices 210 to drop packets in a data flow destined for an oversubscribed client device 230 and/or an overloaded network device 210 and/or processing server 220 (e.g., to make network resources available for an undersubscribed client device 230 and/or to alleviate an overloaded network device 210).

In some implementations, a filter may direct network device 210 to immediately drop data packets to reduce client device network utilization and/or network load at network device 210. Additionally, or alternatively, the filter may direct network device 210 to mark packets, associated with a data flow destined for a particular client device 230, as "discard eligible" when client device network utilization and/or network load exceed thresholds (e.g., subscription thresholds and/or capacity thresholds). As described in greater detail below with respect to FIGS. 5A-5C, "discard eligible" packets may be transmitted if the transmission of these packets does not impact the client device network utilization for other client devices 230 and/or does not overload network devices 210 in a path of the data flow.

In some implementations, optimization instructions 340 may include an instruction to direct network devices 210 to re-route particular data flows from overloaded network devices 210, overloaded paths, and/or overloaded processing servers 220, to underloaded network devices 210, underloaded paths, and/or underloaded processing servers 220. For example, optimization instructions 340 may include an instruction to re-route data flows in accordance with an equal-cost multi-plan (EMCP) routing technique and/or some other type of routing technique.

In some implementations, optimization instructions 340 may include a notification that identifies oversubscribed and/or undersubscribed client devices 230. Additionally, or alternatively, optimization instructions 340 may include a notification that identifies overloaded and/or underloaded network devices 210 and/or processing servers 220. In some implementations, the notification may be provided to an administrator of client device 230 so that the administrator may modify subscription levels of client device 230 (e.g., to increase an amount of bandwidth and/or service for an oversubscribed client device 230). Additionally, or alternatively, the notification may be provided to an administrator of network devices 210 and/or processing servers 220 so that the administrator may take corrective actions to alleviate overloaded network devices 210 and/or processing servers 220.

As described above, load analysis server 260 may receive flow information 310 and/or service utilization information 315 in real-time. Based on receiving flow information 310 and/or service utilization information 315, load analysis server 260 may continuously perform load and utilization measurement function 330 and optimization instructions generation function 335 to generate updated client device network utilization measurements and/or load measurements in real-time. Further, load analysis server 260 may periodically or intermittently update optimization instructions 340 based on the updated client device network utilization measurements and/or load measurements.

In some implementations, load analysis server 260 may store client device network utilization measurements and/or load measurements, and may identify trends in the client device network utilization measurements and/or load measurements. In some implementations, load analysis server 260 may generate optimization instructions 340 based on the trends. In some implementations, load analysis server 260 may generate optimization instructions 340 to drop data packets, even if the client device network utilization measurements and/or load measurements are under a subscribed level and/or a provisioned level. For example, optimization instructions 340 may cause network devices 210 to drop data packets when client device network utilization measurements indicate a utilization rate greater than a particular threshold (e.g., in anticipation that the client device measurements may exceed a subscribed level). Additionally, or alternatively, load analysis server 260 may update optimization instructions 340 based on receiving updates to subscription information 320 and/or topology information 325. In some implementations, load analysis server 260 may provide a notification identifying overloaded network devices 210 and/or processing servers 220.

As further shown in FIG. 3, load analysis server 260 may provide optimization instructions 340 to orchestration server

270. Based on receiving optimization instructions 340, orchestration server 270 may provide optimization instructions to network devices 210. For example, orchestration server 270 may cause network devices 210 to apply filters, drop packets, update routing tables (e.g., to cause data flows to be transmitted via underloaded network devices 210), etc. Additionally, or alternatively, orchestration server 270 may provide optimization instructions to topology server 250 to direct topology server 250 to update path information.

Figure 4:
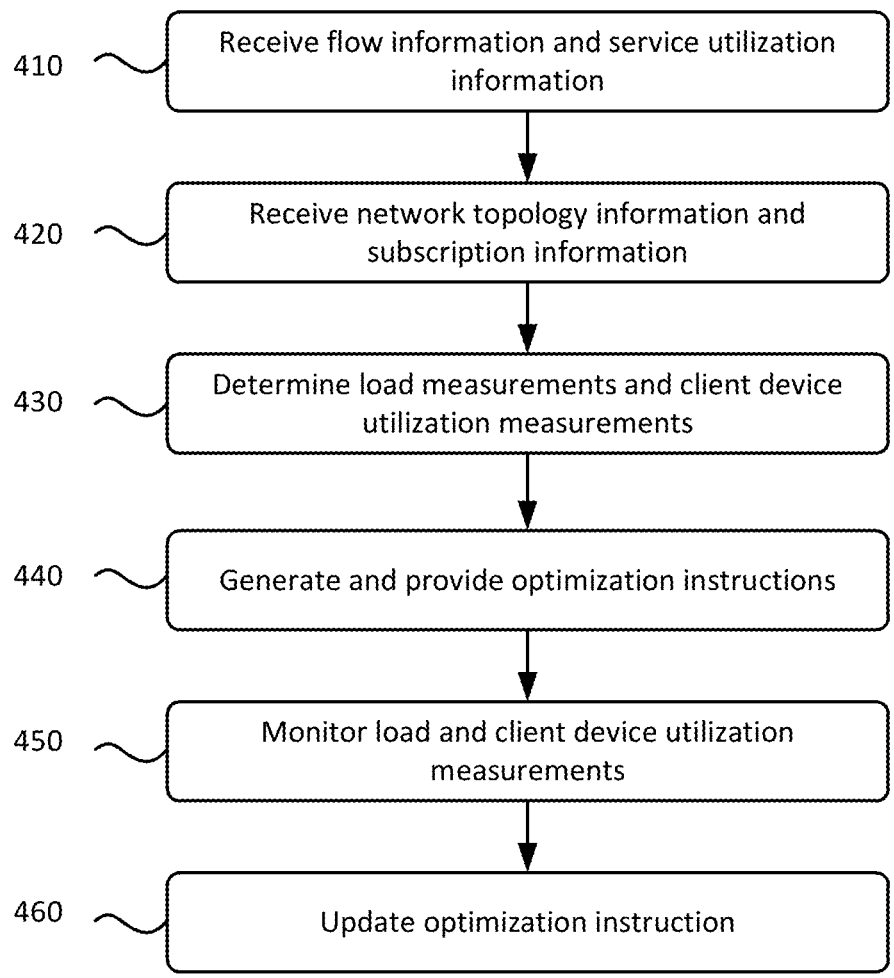
FIG. 4 illustrates a flowchart of an example process for generating and updating optimization instructions based on monitoring client device network utilization measurements and load measurements.

FIG. 4 illustrates a flowchart of an example process 400 for generating and updating optimization instructions based on monitoring client device network utilization measurements and load measurements. In one implementation, process 400 may be performed by one or more components of load analysis server 260. In another implementation, some or all of blocks of process 400 may be performed by one or more components of another device in environment 200 (e.g., network device 210, processing server 220 client device 230, subscription server 240, topology server 250, and/or orchestration server 270), or a group of devices including or excluding load analysis server 260.

As shown in FIG. 4, process 400 may include receiving flow information and service utilization information (block 410). For example, as described above with respect to FIG. 3, load analysis server 260 may receive flow information from network devices 210 and service utilization information from processing server 220.

Process 400 may also include receiving network topology and subscription information (block 420). For example, as described above with respect to FIG. 3, load analysis server 260 may receive network topology information from topology server 250 and subscription information from subscription server 240. In some implementations, load analysis server 260 may receive updates to network topology information and the subscription information when the network topology information and the subscription information is updated.

Process 400 may further include determining client device usage measurements and load measurements (block 430). For example, as described above with respect to FIG. 3, load analysis server 260 may determine client device usage measurements and load measurements based on receiving the flow information and the service utilization information.

Process 400 may also include generating and providing optimization instructions (block 440). For example, as described above with respect to FIG. 3, load analysis server 260 may generate optimization instructions based on the client device usage measurements and/or the load measurements. In some implementations, the optimization instructions may be further based on thresholds, such as thresholds relating to a subscription level (e.g., as identified by the subscription information) and/or load capacity levels (e.g., as identified by the topology information). As described above, optimization instructions may include filters, notifications, routing table updates, etc. The optimization instructions may direct network devices 210 and/or processing server 220 to redirect bandwidth and/or services from oversubscribed client devices 220 to undersubscribed processing servers 220. Additionally, or alternatively, the optimization instructions may alleviate overloaded network devices 210 and/or processing servers 220 (e.g., by routing data flows to underloaded network devices 210 and/or processing servers 220). Based on generating the optimization instructions, load analysis server 260 may provide the optimization instructions to orchestration server 270 to cause orchestration server 270 to apply the optimization instructions to network devices 210 and/or topology server 250, as described above with respect to FIG. 3.

Process 400 may further include monitoring load and client device network utilization measurements (block 450). For example, as described above with respect to FIG. 3, load analysis server 260 may continuously receive flow information and service utilization information in real time and may continuously determine client device network utilization and load measurements. In some implementations, load analysis server 260 may store the client device network utilization and load measurements and monitor these measurements for trends.

Process 400 may also include updating optimization instructions (block 460). For example, as described above with respect to FIG. 3, load analysis server 260 may update the optimization instructions based on monitoring load and client device network utilization measurements. In some implementations, load analysis server 260 may dynamically modify a filter based on the client device network utilization and load measurements. Additionally, or alternatively, load analysis server 260 may dynamically modify routing tables implemented by network devices 210 to modify paths for data flows. Load analysis server 260 may dynamically modify filters and/or paths in order to alleviate overloaded network devices 210 and/or processing servers 220. Further, load analysis server 260 may dynamically modify filters and/or paths in order to redirect bandwidth and/or services from oversubscribed client devices 230 to undersubscribed client devices 230. Additionally, or alternatively, load analysis server 260 may dynamically modify filters and/or paths in order to provide bandwidth and/or network services for an oversubscribed client device 230 when network devices 210 and/or processing server 220 have capacity to provide the bandwidth and/or services. An example of providing bandwidth and/or network services for an oversubscribed client device 230 is described below with respect to FIG. 8B.

Figure 5A:
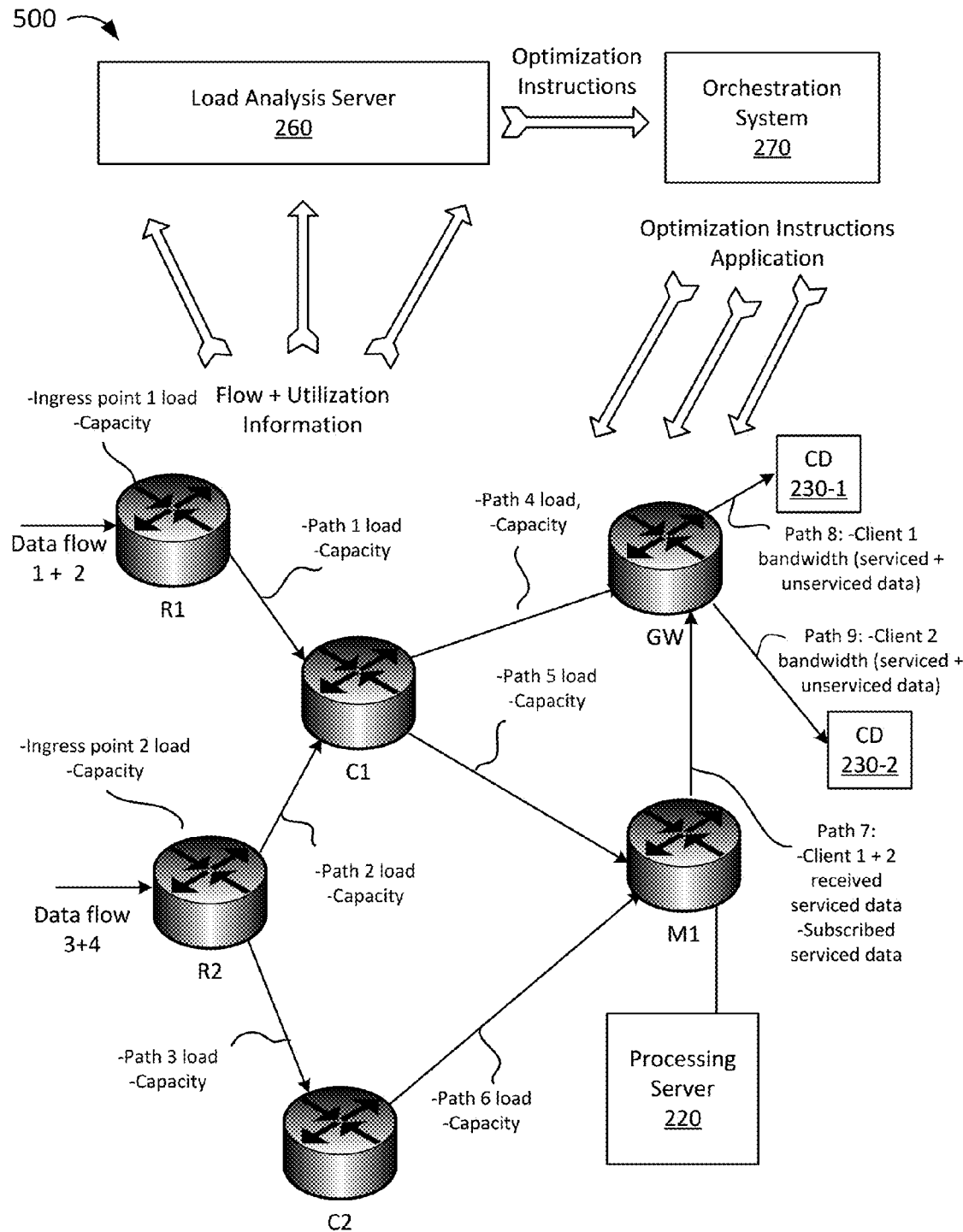
FIGS. 5A-5C illustrate example implementations of generating optimization instructions for network devices based on load information.
Figure 5B:
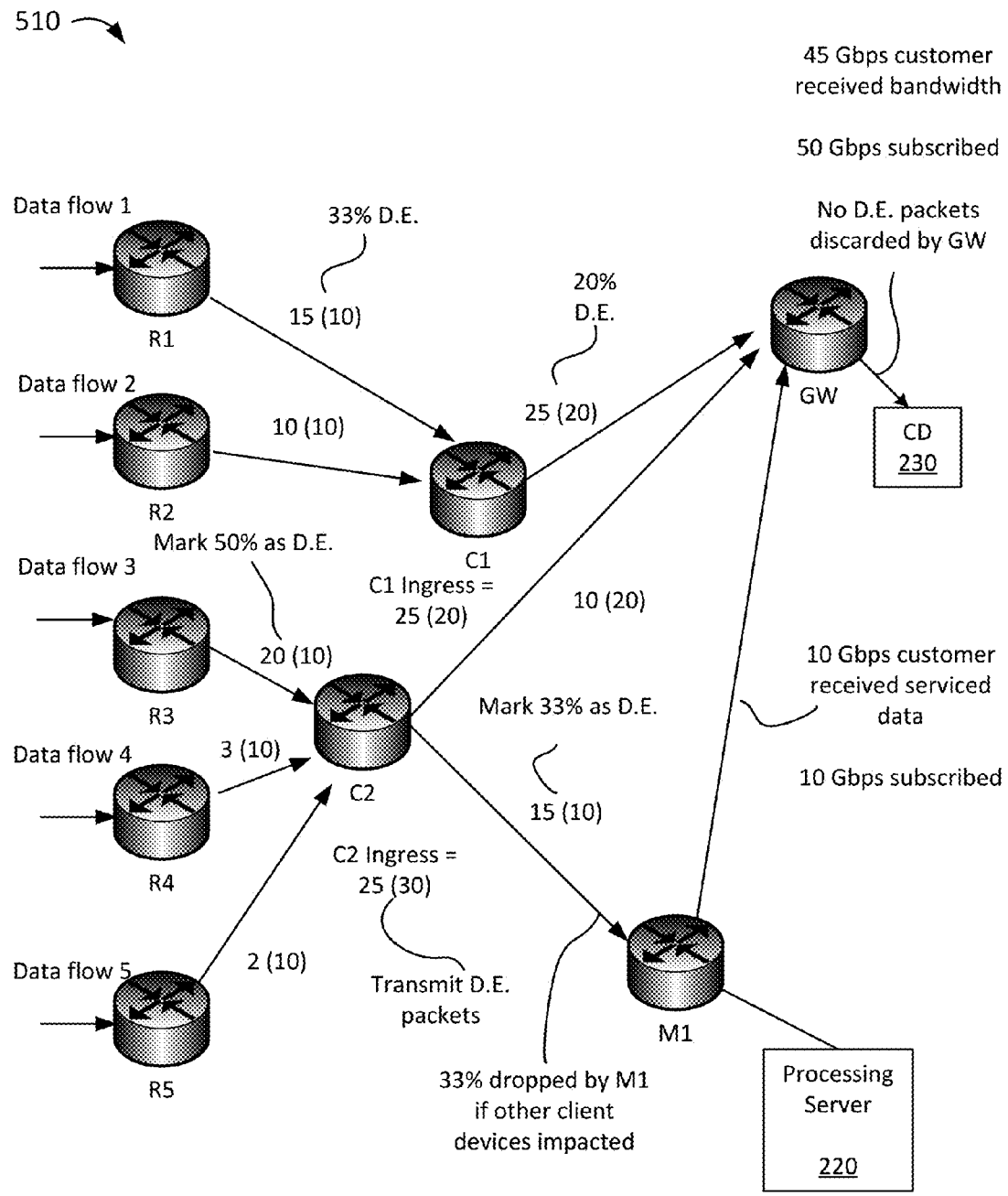
Figure 5C:
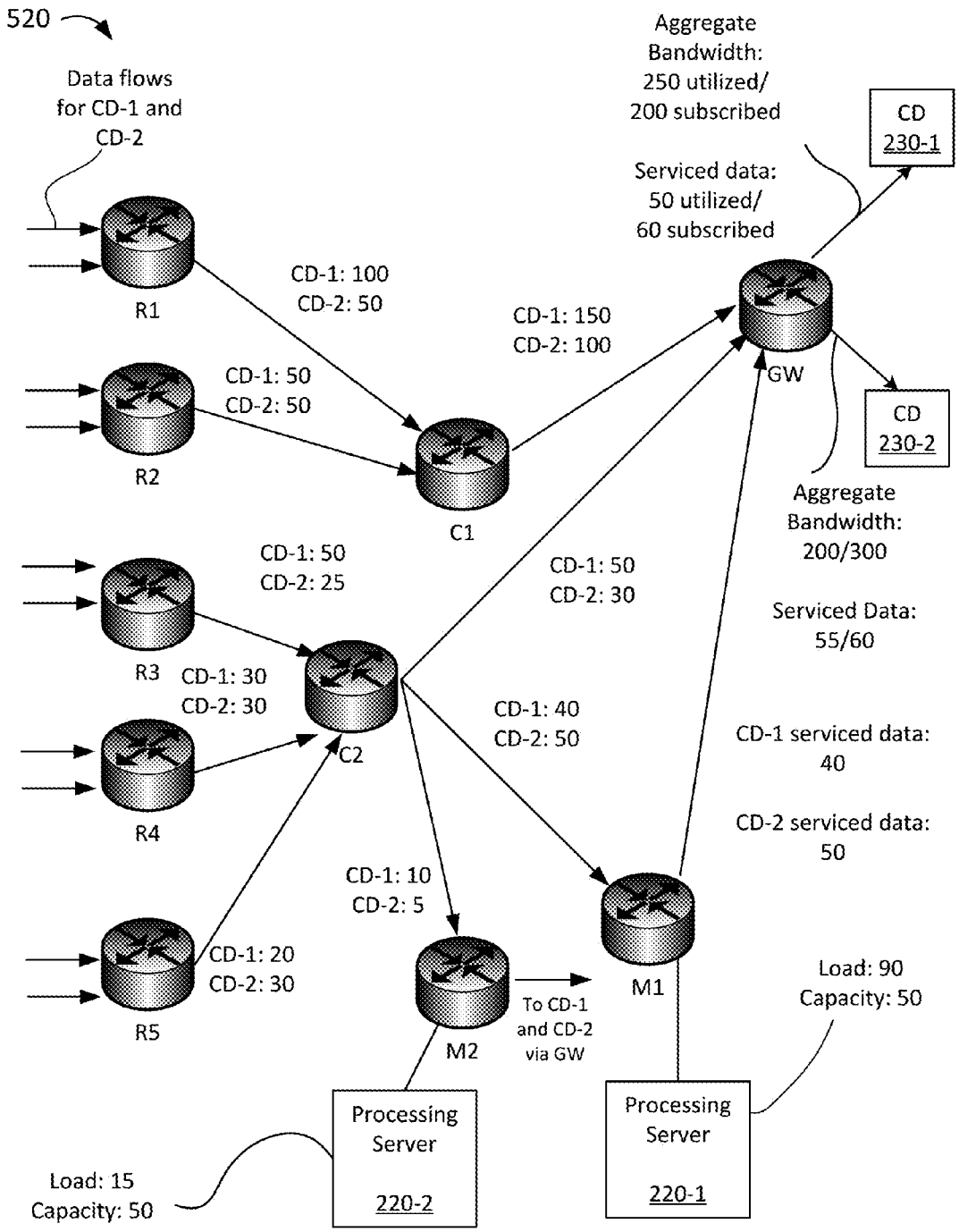

FIGS. 5A-5C illustrate example implementations of generating optimization instructions for network devices 210 based on load information. As shown in FIG. 5A, network 500 may include backend network devices 210 (to be referred to in FIGS. 5A-5C as "R1" and "R2"), intermediate network devices 210 (to be referred to in FIGS. 5A-5C as "C1" and "C2"), servicing network device 210 (e.g., to be referred to in FIGS. 5A-5C as "M1"), client network device 210 (to be referred to in FIGS. 5A-5C as "GW"), processing server 220, a first client device 230 (e.g., client device 230-1), a second client device 230 (e.g., client device 230-2), load analysis server 260, and orchestration server 270.

In FIG. 5A, assume that R1 receives data flows 1 and 2, and that R2 receives data flows 3 and 4. Further, assume that data flow 1 and data flow 3 are destined for client device 230-1, and that data flow 2 and data flow 4 are destined for client device 230-2 (e.g., via C1, C2, M1, and GW). M1 may receive data (e.g., via C1 and C2) that is to be serviced by processing server 220. Processing server 220 may receive the data, provide a service relating to the data (e.g., a DDOS mitigation service) to form serviced data, and provide the serviced data to client device 230-1 and 230-2 via M1 and GW. GW may provide serviced data and unserviced data to client device 230-1 and client device 230-2. The aggregate of the serviced data and the unserviced data, provided to client device 230-1 and client device 230-2, may correspond to aggregate bandwidth utilization (e.g., client device network utilization) for client device 230-1 and client device 230-2, respectively. The serviced data, provided to client device 230-1 and client device 230-2, may correspond to service utilization for client device 230-1 and client device 230-2, respectively.

In some implementations, load analysis server 260 may receive flow information and service utilization information from each of R1, R2, C1, C2, M1, GW, and processing server 220 (e.g., via M1). Load analysis server 260 may determine a measure of network load at each point in network 500 based on the flow information and service utilization information. For example, load analysis server 260 may determine a measure of network load between paths of connected network devices 210, and a measure of load at each ingress point for each network device 210. As described above, load analysis server 260 may determine the measure of network load at each path based on topology information stored by topology server 250.

The measure of network load may correspond to an aggregate of client device network utilization by client device 230-1 and client device 230-2. For example, load analysis server 260 may determine a load of a path connecting R1 and C1 (shown in FIG. 5A as "Path 1 load"). Assuming that no filters are in place at R1, path 1 load may be the aggregate of the load of data flow 1 and data flow 2 and may correspond to the ingress load at point 1. The path 2 load may include a portion of the load from data flow 3 and data flow 4, and the path 3 load may include another portion of the load from data flow 3 and data flow 4. The ingress load at point 3 may include the aggregate of the path 1 load and the path 2 load. Similarly, the ingress load at point 6 may include the aggregate of path 4 load and path 5 load.

As further shown in FIG. 5A, load analysis server 260 may determine network load at each of paths 1 through 9 and ingress points 1 through 6. The network load at path 8 may correspond to client device network utilization for client device 230-1, and the network load at path 9 may correspond to client device network utilization for client device 230-2.

Based on determining network load measurements and client device network utilization, load analysis server 260 may generate optimization instructions. For example, as further shown in FIG. 5A, the load at each path and ingress point may be compared to a provisioned capacity at each path and ingress point (e.g., to identify overloaded network devices 210). Also, the client device network utilization for client device 230-1 and client device 230-2 may be compared to subscription information (e.g., to identify oversubscribed undersubscribed client devices 230). Load analysis server 260 may generate optimization instructions in order to alleviate overloaded network components and provide client device 230-1 and client device 230-2 with a level of bandwidth and/or serviced data that the client device 230-1 and client device 230-2 have subscribed to. For example, if client device 230-1 is undersubscribed and client device 230-2 is oversubscribed, load analysis server 260 may apply filters to drop packets in for data flows 2 and 4 (since data flows 2 and 4 are destined for client device 230-2) in order to make network resources available for client device 230-1. Also, the load analysis system may monitor network load and client device network utilization measurements in real-time, and may adjust the optimization instructions based on real-time network load and client device network utilization measurements.

Referring to FIG. 5B, network 510 may include backend network devices 210 (e.g., R1, R2, R3, R4, and R5), intermediate network devices 210 (e.g., C1 and C2), servicing network device 210 (e.g., M1), client network device 210 (e.g., GW), and client device 230. As shown in FIG. 5B, R1 through R5 may receive data flow 1 through data flow 5, respectively. Assume that data flow 1 through data flow 5 are destined for client device 230. In FIG. 5B, network load at each path and ingress point is identified in units of Gbps. Further, capacity of each path and ingress point is illustrated in parentheticals. For example, the notation "10 (10)" indicates that the load at the path or ingress point is 10 Gbps and the capacity is 10 Gbps. The network loads illustrated in FIG. 5B are based on network load measurements generated by load analysis server 260 based on flow information provided by network devices 210. The capacity values illustrated in FIG. 5B may be based on capacity information stored by topology server 250. Additionally, or alternatively, the capacity values may be based on subscription information stored by subscription server 240.

In FIG. 5B, assume that client device 230 is subscribed to 50 Gbps of aggregate bandwidth and 10 Gbps of serviced data from processing server 220. Further, assume that the capacity of each of R1 through R5 is 10 Gbps, corresponding to the 50 Gbps of subscribed aggregate bandwidth. Further, assume that the capacity of C1 is 20 Gbps, and the capacity of C2 is 30 Gbps, corresponding to the 50 Gbps of subscribed aggregate bandwidth. Further, assume that the capacity of M1 is 10 Gbps corresponding to the 10 Gbps of subscribed serviced data.

In FIG. 5B, assume that data flow 1 through data flow 5 have bit rates of 15 Gbps, 10 Gbps, 20 Gbps, 3 Gbps, and 2 Gbps, respectively. As shown in FIG. 5B, R1 and R2 may connect to C1, and C1 may provide data flows from R1 and R2 to client device 230 via GW. R3, R4, and R5 may connect to C2, and C2 may provide a portion of packets from data flow 3 through data flow 5 to client device 230 via GW, and another portion of packets to processing server 220 via M1. Processing server 220 may receive the packets to be serviced, and provide serviced packets to client device 230 via M1 and GW.

In some implementations, each network device 210 in network 510 may include filters that direct each network device 210 to mark packets as "discard eligible" (D.E.) when the network load exceeds capacity. For example, assume that the network load from the path connecting R1 and C1 is 15 Gbps (e.g., since the bit rate of data flow 1 is 15 Gbps). Given this assumption, R1 may mark 33% of the packets in dataflow 1 as D.E (e.g., since the network load is 33% above capacity). In some implementations, D.E. packets may be discarded when the aggregate bandwidth, provided by GW, is greater than a subscribed level of aggregate bandwidth for client device 230 (e.g., when client device 230 is oversubscribed). Additionally, or alternatively, packets may be discarded when the load at M1 is greater than the subscribed level of services for client device 230 (e.g., when client device 230 is oversubscribed to services provided by client device 230). Additionally, or alternatively, packets may be discarded when other client devices 230 may be impacted by client device 230 being oversubscribed (e.g., when the other client devices 230 are undersubscribed to services provided by processing server 220 as a result of client device 230 being oversubscribed).

In the example shown in FIG. 5B, the D.E. packets for unserviced packets (e.g., packets that are not provided to processing server 220) are not discarded since the aggregate bandwidth of client device 230 is under capacity (e.g., within the subscribed level). That is, packets associated with data flow 1 and data flow 3 may be transmitted even when the bit rate of data flow 1 and data flow 3 is greater than a filtered capacity. The packets in data flow 1 and data flow 3 may be transmitted since the bit rate of data flow 2, data flow 4, and data flow 5 are under capacity.

While not shown in FIG. 5B, network devices 210 and/or processing server 220 may be overloaded from a hardware or network standpoint, even if client device 230 is not oversubscribed. When network devices 210 and/or processing server 220 are overloaded from a hardware standpoint when client device 230 is not oversubscribed, load analysis server 260 may generate instructions to cause network devices 210 to re-route data flows from overloaded network devices 210 and/or processing server 220 to underloaded network devices 210 and/or processing servers 220.

Also, load analysis server 260 may implement dynamic filters to drop data from one backend network device 210 while permitting additional data from another network device 210. For example, assuming that client device 230 is subscribed to receive 50 Gbps of aggregate bandwidth across R1, R2, R3, R4, and R5, load analysis server 260 may generate optimization instructions that dynamically update filters at R1, R2, R3, R4, and R5. The filters may be dynamically updated to adjust the bit rates of data flows provided by R1, R2, R3, R4, and R5. In the example of FIG. 5B, the optimization instruction may adjust the filters at R1, R2, R3, R4, and R5 to 15 Gbps, 10 Gbps, 20 Gbps, 3 Gbps, and 2 Gbps, respectively so that client device 230 receives 50 Gbps of bandwidth. As the bit rates of data flow 1 through data flow 5 adjust, load analysis server 260 may modify the optimization instruction to dynamically adjust the filters at R1, R2, R3, R4, and R5 so that client device 230 continues to receive 50 Gbps of bandwidth even if the bandwidth is not evenly spread across R1, R2, R3, R4, and R5 (e.g., in the case of a DDOS attack).

In some implementations optimization instructions may permit client device 230 to be oversubscribed when capacity is available. For example, referring to FIG. 5C, load analysis server 260 may determine network load and/or client device network utilization across network 520 in a similar manner as described above. In FIG. 5C, assume that R1 through R5 receive data flows destined for client device 230-1 and client device 230-2. As shown in FIG. 5C, R1 may receive a data flow destined for client device 230-1 having a bit rate of 100 Gbps (shown as "CD-1: 100" in FIG. 5C). As further shown in FIG. 5C R1 may receive a data flow destined for client device 230-2 having a bit rate of 50 Gbps (shown as "CD-2: 50" in FIG. 5C). Similarly, R2 may receive a data flow destined for client device 230-1 having a bit rate of 50 Gbps, and a data flow destined for client device 230-2 having a bit rate of 50 Gbps. R3, R4, and R5 may each receive data flows, destined for client device 230-1 and 230-2, having bit rates as shown. In FIG. 5C, assume that filters are not currently implemented by any network device 210. That is, assume that all packets from data flows, received by R1 through R5, are provided to client device 230-1 and client device 230-2.

Based on flow information received from network devices 210 in network 520, load analysis server 260 may determine a client device network utilization (e.g., an aggregate bandwidth utilization) of 250 Gbps for client device 230-1 in relation to a subscribed bandwidth of 200 Gbps. That is, client device 230-1 is oversubscribed by 50 Gbps. Further, load analysis server 260 may determine an aggregate bandwidth utilization of 200 Gbps in relation to a subscribed bandwidth of 300 Gbps. That is, the bandwidth utilization of client device 230-2 is under capacity by 100 Gbps even when receiving all packets of data flows received by R1 through R5. In some implementations, load analysis server 260 may generate optimization instructions to permit client device 230-1 to receive the aggregate bandwidth of 250 Gbps (e.g., 50 Gbps over the subscribed capacity) since client device 230-2 is 100 Gbps under subscribed capacity. If, at a later time for example, R1 through R5 received data flows having a higher bit rate than shown in FIG. 5C, (e.g., such that the aggregate bandwidth of client device 230-2 is increased beyond 250 Gbps), load analysis server 260 may generate optimization instructions to drop packets for data flows destined for client device 230-1 at R1 through R5 to make capacity available for client device 230-2 to receive bandwidth in accordance with the subscribed capacity.

As described above, load analysis server 260 may generate optimization instructions to offload overloaded processing servers 220. As shown in FIG. 5C, client device 230-1 and client device 230-2 may each utilize a lower level of service than subscribed levels (e.g., client device 230-1 may utilize 50 Gbps in relation to a subscription level of 60 Gbps, and client device 230-2 may utilize 55 Gbps in relation to a subscription level of 60 Gbps). As further shown in FIG. 5C, processing server 220-1 may be overloaded even when client device 230-1 and client device 230-2 utilize less than a subscribed level of service. In some implementations, load analysis server 260 may generate optimization instructions to direct packets from processing server 220-1 to processing server 220-2 (e.g., since processing server 220-2 is underloaded).

In some implementations, load analysis server 260 may generate optimization instructions to prioritize the transmission of packets that may be in need of servicing over those packets that may not need servicing. For example, assume that a particular backend network device 210 receives a burst of data that is greater than a threshold number of standard deviations away from an average amount of data that the particular backend network device 210 receives (e.g., in the case of a DDOS attack). Given this assumption, load analysis server 260 may generate an optimization instruction to cause a filter at the particular backend network device 210 to permit a greater proportion of data to be transmitted to processing server 220 (e.g., such that the data may receive a DDOS mitigation service). Further, the optimization instructions may cause filters at other backend network devices 210 to transmit a smaller proportion of data (e.g., to permit the particular backend network device 210 to transmit a greater proportion of data towards processing server 220).

As described above, load analysis server 260 may generate optimization instructions based on a rate of increase of network and/or hardware load. For example, load analysis server 260 may generate optimization instructions to re-route data and/or drop packets in anticipation that client device network utilization, network, and/or hardware load may exceed particular thresholds (e.g., thresholds corresponding to subscribed levels of client device network utilization, network and/or hardware capacity load thresholds, etc.).

Figure 6:
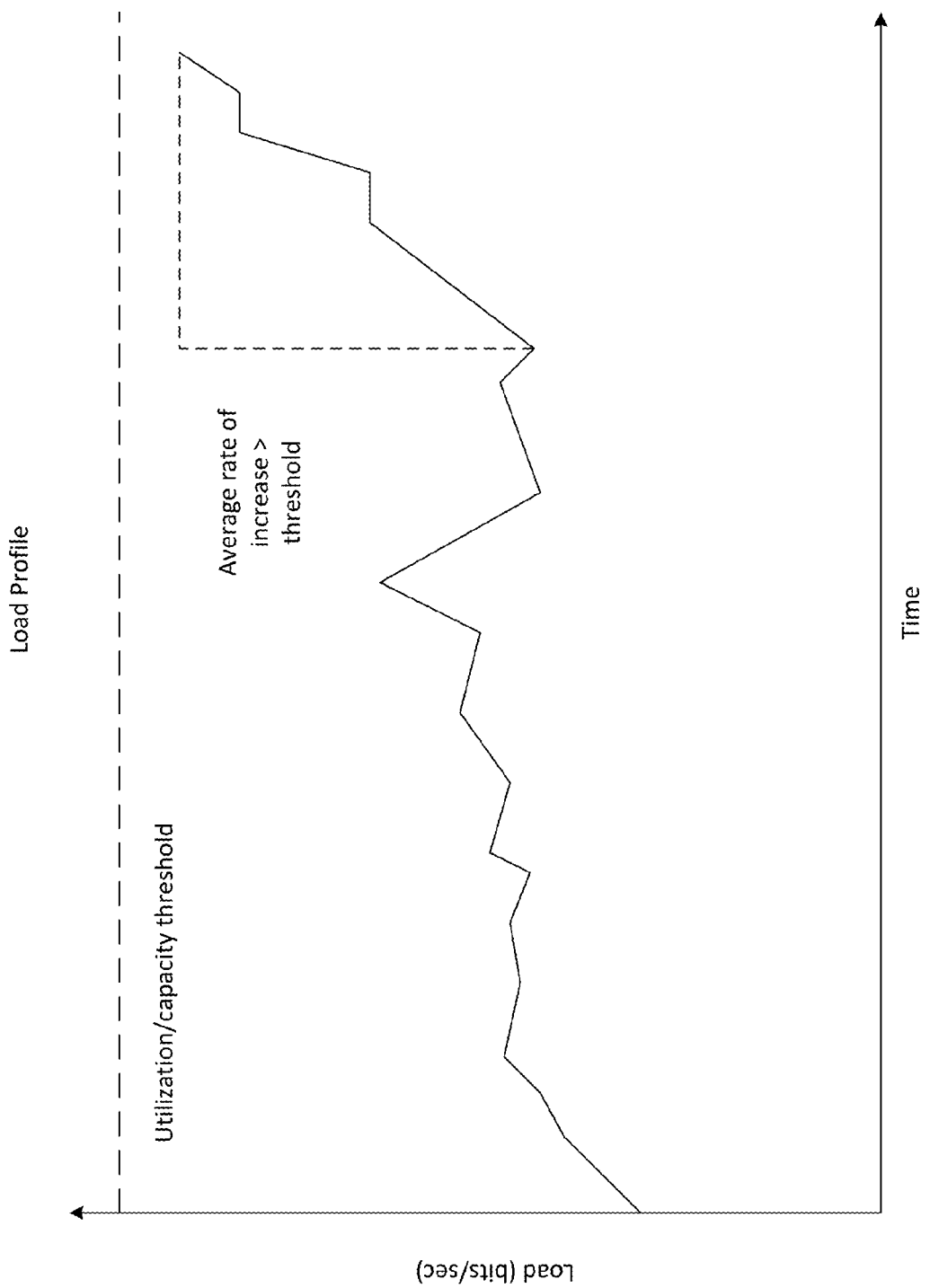
FIG. 6 illustrates an example graph of load measurements for a particular network device or processing server.

FIG. 6 illustrates an example graph of load measurements for a particular network device 210 or processing server 220. The graph in FIG. 6 may correspond to load measurements (e.g., network load measurements and/or hardware load measurements) for a particular network device 210 or processing server 220 over a period of time. In some implementations, load analysis server 260 may determine that an average rate of increase of the load measurements exceeds a particular threshold. Load analysis server 260 may generate optimization instructions to reduce the load of the particular network device 210 or processing server 220 when the average rate of increase exceeds the particular threshold even if the load is less than a client device network utilization threshold, a network load capacity threshold, and/or a hardware load threshold. For example, load analysis server 260 may generate optimization instructions to apply filters and/or re-route packets in anticipation that the load on the particular network device 210 or processing server 220 may exceed a client device network utilization threshold and/or a hardware capacity threshold.

While particular examples are shown in FIGS. 5A through 5C, and FIG. 6, the above descriptions are merely an example implementations. In practice, other examples are possible from what is described above in FIGS. 5A through 5C, and FIG. 6.

FIG. 7 is a diagram of example components of device 700. One or more of the devices described above (e.g., with respect to FIGS. 1-3, and 5A through 5C) may include one or more devices 700. Device 700 may include bus 710, processor 720, memory 730, input component 740, output component 750, and communication interface 760. In another implementation, device 700 may include additional, fewer, different, or differently arranged components.

Bus 710 may include one or more communication paths that permit communication among the components of device 700. Processor 720 may include a processor, microprocessor, or processing logic that may interpret and execute instructions. Memory 730 may include any type of dynamic storage device that may store information and instructions for execution by processor 720, and/or any type of non-volatile storage device that may store information for use by processor 720.

Input component 740 may include a mechanism that permits an operator to input information to device 700, such as a keyboard, a keypad, a button, a switch, etc. Output component 750 may include a mechanism that outputs information to the operator, such as a display, a speaker, one or more light emitting diodes ("LEDs"), etc.

Communication interface 760 may include any transceiver-like mechanism that enables device 700 to communicate with other devices and/or systems. For example, communication interface 760 may include an Ethernet interface, an optical interface, a coaxial interface, or the like. Communication interface 760 may include a wireless communication device, such as an infrared ("IR") receiver, a Bluetooth® radio (Bluetooth is a registered trademark of Bluetooth SIG, Inc.), radio, or the like. The wireless communication device may be coupled to an external device, such as a remote control, a wireless keyboard, a mobile telephone, etc. In some embodiments, device 700 may include more than one communication interface 760. For instance, device 700 may include an optical interface and an Ethernet interface.

Device 700 may perform certain operations relating to one or more processes described above. Device 700 may perform these operations in response to processor 720 executing software instructions stored in a computer-readable medium, such as memory 730. A computer-readable medium may be defined as a non-transitory memory device. A memory device may include space within a single physical memory device or spread across multiple physical memory devices. The software instructions may be read into memory 730 from another computer-readable medium or from another device. The software instructions stored in memory 730 may cause processor 720 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations. For example, while series of blocks and/or signal flows have been described with regard to FIGS. 3 and 4, the order of the blocks and/or signal flows may be modified in other implementations. Further, non-dependent blocks may be performed in parallel.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown (e.g., in FIGS. 2, 5A, 5B, and 5C), in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

Some implementations are described herein in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "satisfying" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method comprising:
receiving, by a server, flow information from a plurality of network devices of a network,
the flow information including information regarding a plurality of data flows received by the plurality of network devices and destined for a client device;
determining, by the server and based on the flow information, an aggregate amount of utilization, of the plurality of network devices, associated with the client device;
determining, by the server, that the aggregate amount of utilization exceeds a threshold amount associated with the client device, the threshold amount being determined based on a subscription associated with the client device;
identifying, by the server, one or more paths between respective network devices, of the plurality of network devices, the one or more paths each being associated with a provisioned capacity;
selecting, by the server and based on determining that the aggregate amount of utilization exceeds the threshold amount associated with the client device, a particular path, of the one or more paths, the selecting being further based on identifying that utilization, associated with the client device, of the particular path exceeds the provisioned capacity, of the particular path;
instructing, by the server, one or more network devices associated with the selected path, to mark a proportion of traffic destined for the client device as discard eligible,
the instructing being performed based on the determination that the aggregate amount of utilization exceeds the threshold amount associated with the client device, and that the utilization, of the particular path, exceeds the provisioned capacity of the particular path;
determining, by the server, whether another client device, that is communicatively coupled to one or more of the plurality of network devices, is undersubscribed to a particular service;
generating, by the server and when the other client device is undersubscribed to the particular service, an optimization instruction for at least one of the one or more network devices associated with the selected particular path, based on determining that the aggregate amount of utilization, associated with the client device, exceeds the threshold amount, the optimization instruction including an instruction to drop some or all of the traffic, associated with the client device, that has been marked as discard eligible;
providing, by the server and to the one or more network devices associated with the selected particular path, the optimization instruction, to cause the at least one of the one or more of the plurality of network devices, associated with the selected particular path, to drop some or all of the traffic, associated with the client device, that has been marked as discard eligible;
permitting, by the server, the data flow to traverse the one or more network devices associated with the selected particular path, without being dropped, when the other client is not undersubscribed to the particular service; and updating, by a topology server, as a topology of the network changes, topology information stored by the topology server, the topology information concerning the optimization instruction, wherein the topology information includes at least one of:
physical and logical connection information for the network devices,
path information between the network devices,
load capacities of paths between the network devices, or
hardware load capacities of the network devices.

2. The method of claim 1, further comprising:
determining, based on the flow information, load measurements relating to a measure of hardware or network load associated with the plurality of network devices;
receiving updated flow information;
determining, based on the updated flow information, updated load measurements;
identifying a trend between the load measurements and the updated load measurements; and
generating an updated optimization instruction based on the identification of the trend.

3. The method of claim 1, wherein the optimization instruction further causes a particular network device, of the plurality network devices, to:
permit transmission of the one or more packets, associated with the client device, when the aggregate amount of utilization, associated with the client device is not exceeded, and also when the utilization, associated with the client device, of the particular path does not exceed the provisioned capacity, of the particular path.

4. The method of claim 1, further comprising:
receiving subscription information associated with the client device, the subscription information identifying the aggregate amount of network utilization to which the client device is subscribed.

5. The method of claim 2, wherein determining the load measurements includes determining load measurements of one or more paths connecting respective network devices, of the plurality of network devices.

6. One or more server devices including processing circuitry to:
receive flow information from a plurality of network devices, the flow information including information regarding a plurality of data flows received by the plurality of network devices of a network and destined for a first client device;
determine, based on the flow information, an aggregate amount of utilization, of the plurality of network devices, associated with the first client device;
determine an aggregate amount of utilization, of the plurality of network devices, associated with a second client device;
determine that the aggregate amount of utilization, associated with the first client device, exceeds a first threshold amount associated with the first client device, the first threshold amount being determined based on a subscription associated with the first client device;
determine that the aggregate amount of utilization, associated with the second client device, does not exceed a second threshold amount associated with the second client device, the second threshold amount being determined based on a subscription associated with the second client device;

identify one or more paths between respective network devices, of the plurality of network devices, the one or more paths each being associated with a provisioned capacity;

select a particular path, of the one or more paths, based on identifying that utilization of the particular path exceeds the provisioned capacity, of the particular path;

instruct one or more network devices associated with the selected path, to mark a proportion of traffic destined for the first client device as discard eligible, the instructing being performed based on the determination that the aggregate amount of utilization, associated with the first client device, exceeds the first threshold amount, and that the utilization, of the particular path, exceeds the provisioned capacity of the particular path;

generate an optimization instruction, to drop some or all of the traffic, associated with the first client device, that has been marked as discard eligible, the optimization instruction being generated based on:

the determination that the aggregate amount of utilization, associated with the first client device, exceeds the first threshold amount, the determination that the utilization of the particular path exceeds the provisioned capacity, of the particular path, and the determination that the aggregate amount of utilization, associated with the second client device, does not exceed the second threshold amount;

provide, to the one or more of the network devices associated with the selected particular path, the optimization instruction, to cause at least one of the one or more of the plurality of network devices, associated with the selected particular path, to drop some or all of the traffic, associated with the first client device, that has been marked as discard eligible; and update, as a topology of the network changes, topology information concerning the optimization instruction, wherein the topology information includes at least one of:

physical and logical connection information for the network devices, path information between the network devices, load capacities of paths between the network devices, or hardware load capacities of the network devices.

7. The one or more server devices of claim 6, wherein the server is further to:

determine, based on the flow information, load measurements relating to a measure of hardware or network load associated with the plurality of network devices;

receive updated flow information;

determine, based on the updated flow information, updated load measurements;

identify a trend between the load measurements and the updated load measurements; and generate the updated optimization instruction based on the identification of the trend.

8. The one or more server devices of claim 6, wherein the optimization instruction further causes a particular network device, of the plurality network devices, to:

permit transmission of the one or more packets, associated with the first client device, when the aggregate amount of utilization, associated with the first client device is not exceeded, and also when the utilization of the particular path does not exceed the provisioned capacity, of the particular path.

9. The one or more server devices of claim 6, wherein the server is further to:

identify overloaded network devices or processing servers based on the flow information, wherein the optimization instruction causes the plurality of network devices to reduce load on the overloaded network devices or processing servers.

10. The one or more server devices of claim 6, wherein the server is further to:

receive subscription information associated with the first client device, the subscription information identifying the aggregate amount of network utilization to which the first client device is subscribed.

11. The one or more server devices of claim 7, wherein determining the load measurements includes determining load measurements of one or more paths connecting respective network devices, of the plurality of network devices.

12. The method of claim 1, wherein each network device, of the plurality of network devices, is associated with a measure of utilization for traffic destined to the user device, wherein the aggregate amount of utilization, associated with the client device, is based on a sum of the measures of utilization, for traffic destined to the user device, of the plurality of network devices.

13. The one or more server devices of claim 6, wherein each network device, of the plurality of network devices, is associated with a measure of utilization for traffic destined to the user device, wherein the aggregate amount of utilization, associated with the client device, is based on a sum of the measures of utilization, for traffic destined to the user device, of the plurality of network devices.

14. A system, comprising:

a non-transitory computer-readable medium storing a plurality of processor-executable instructions; and one or more processors configured to execute the processor-executable instructions, wherein executing the processor-executable instructions causes the system to:

receive subscription information that indicates a maximum aggregate amount of network utilization to which a particular client device is subscribed;

receive topology information associated with a network that includes a plurality of network devices, the topology information indicating a provisioned capacity of one or more paths in the network, wherein a particular path includes a communication path between a first network device and a second network device, of the plurality of network devices;

determine an aggregate amount of network utilization associated with the particular client device;

compare the aggregate amount of network utilization to the maximum aggregate amount of network utilization, indicated by the subscription information;

determine, based on the comparing, that the aggregate amount of network utilization exceeds the maximum aggregate amount of network utilization, indicated by the subscription information;

determine whether another client device is receiving at least a particular level of service, the particular level of service being determined based on subscription information associated with the other client device;

receive load information, associated with the one or more paths;

compare the received load information, associated with the one or more paths, to the provisioned capacity of the one or more paths;

select, based on the comparing, a particular path, of the one or more paths, for which the load information indicates that the particular path is overloaded, with respect to the provisioned capacity of the particular path;

instruct one or more network devices associated with the selected path, to mark a proportion of traffic destined for the particular client device as discard eligible,
- the instructing being performed based on the determination that the aggregate amount of network utilization, associated with the particular client device, exceeds the first maximum aggregate amount, and that the particular path is overloaded;

instruct, when the other client device is not receiving at least the particular level of service associated with the other client device, one or more network devices, associated with the selected particular path, to drop some or all of the traffic, associated with the particular client device, that has been marked as discard eligible;

forgo instructing, when the other client device is receiving at least the particular level of service associated with the other client device, the one or more network devices, associated with the selected particular path, to drop traffic associated with the client device, wherein the forgoing permits the traffic, associated with the particular client device, that has been marked as discard eligible, to be transmitted along the selected particular path; and update, as a topology of the network changes, the topology information, wherein the updated topology information includes at least one of:
- physical and logical connection information for the network devices,
- path information between the network devices,
- load capacities of paths between the network devices, or
- hardware load capacities of the network devices.

15. The system of claim 14, wherein the aggregate amount of utilization, associated with the particular client device, is based on a sum of the measures of utilization, for traffic destined to the user device, of the plurality of network devices.

16. The system of claim 14, wherein the aggregate amount of utilization, associated with the particular client device, includes a measure of bandwidth used by each network device, of the plurality of network devices, for traffic destined to the user device.

17. The system of claim 14, wherein the proportion of traffic to drop is based on a proportion by which the selected particular path is overloaded.

18. The system of claim 14, wherein the particular path is a first path, wherein executing the processor-executable instructions further causes the system to:
- select a second path, of the plurality of paths, for which the load information indicates that the second path is not overloaded, with respect to the provisioned capacity; and
- modify a topology of the network to reroute traffic, destined for the client device, from the first path to the second path.

19. The system of claim 14, wherein the plurality of network devices include at least one of:
- one or more routers,
- one or more gateways,
- one or more modems,
- one or more switches,
- one or more firewalls,
- one or more network interface cards, or
- one or more hubs.

20. The method of claim 1, wherein the optimization instruction, to drop traffic marked as discard eligible, is provided to a network device other than one or more network devices that marked the traffic as discard eligible.

* * * * *